(12) United States Patent
Hanrahan et al.

(10) Patent No.: US 7,554,771 B2
(45) Date of Patent: Jun. 30, 2009

(54) TOLERANCE RING FOR DATA STORAGE WITH OVERLAPPING TAB FEATURE FOR MASS CONTROL

(75) Inventors: Kevin P. Hanrahan, Santa Barbara, CA (US); Ryan J. Schmidt, Santa Barbara, CA (US); David D. Dexter, Goleta, CA (US)

(73) Assignee: Intri-Plex Technologies, Inc., Santa Barbara, CA (US)

( * ) Notice: Subject to any disclaimer, the term of this patent is extended or adjusted under 35 U.S.C. 154(b) by 484 days.

(21) Appl. No.: 11/519,270

(22) Filed: Sep. 11, 2006

(65) Prior Publication Data
US 2008/0062572 A1    Mar. 13, 2008

(51) Int. Cl.
*G11B 5/55* (2006.01)
(52) U.S. Cl. .................................. 360/265.2
(58) Field of Classification Search ............ 360/265.2, 360/265.6, 265.7; 403/365, 371
See application file for complete search history.

(56) References Cited

U.S. PATENT DOCUMENTS

| | | | |
|---|---|---|---|
| 1,662,544 A | 3/1928 | Solenberger | |
| 2,628,113 A | 2/1953 | Jones | |
| 2,886,354 A | 5/1959 | Bjorklund | |
| 2,897,026 A | 7/1959 | Haller et al. | |
| 2,931,412 A | 4/1960 | Wing | |
| 2,950,937 A | 8/1960 | Bedford, Jr. | |
| 3,061,386 A | 10/1962 | Dix et al. | |
| 3,125,397 A | 3/1964 | McGrath | |
| 3,142,887 A | 8/1964 | Hulck et al. | |
| 3,145,547 A | 8/1964 | Lyons | |
| 3,156,281 A | 11/1964 | Demi | |
| 3,197,243 A | 7/1965 | Brenneke | |
| 3,233,497 A | 2/1966 | McCormick | |
| 3,396,554 A | 8/1968 | Westercamp | |
| 3,494,676 A | 2/1970 | Compton | |
| 3,672,708 A | 6/1972 | Zemberry | |
| 3,700,271 A | 10/1972 | Blaurock et al. | |
| 3,730,569 A | 5/1973 | Feinler | |
| 3,768,845 A | 10/1973 | Gilliland | |
| 3,838,928 A | 10/1974 | Blaurock et al. | |
| 3,861,815 A | 1/1975 | Landaeus | |
| 4,069,618 A | 1/1978 | Geiss | |
| 4,222,310 A | 9/1980 | Garrett et al. | |
| 4,286,894 A | 9/1981 | Rongley | |
| 4,790,683 A | 12/1988 | Cramer, Jr. et al. | |
| 4,828,423 A | 5/1989 | Cramer, Jr. et al. | |
| 4,981,390 A * | 1/1991 | Cramer et al. | 403/371 |

(Continued)

FOREIGN PATENT DOCUMENTS

DE        916370        8/1954

(Continued)

*Primary Examiner*—Tianjie Chen

(57) ABSTRACT

A tolerance ring for coupling an actuator arm to a pivot bearing while maintaining mass eccentricity of the actuator arm. The tolerance ring having a substantially cylindrical base portion with a first radius about a central axis and extending a length parallel to the central axis, the cylindrical base portion has a first tab and a second tab extending along the length of the cylindrical base portion, the first tab being positioned proximate to the second tab. The tolerance ring improves mass eccentricity by radially displacing the first tab at a second radius about the axis such that a radial gap is formed between the first tab and second tab.

16 Claims, 9 Drawing Sheets

U.S. PATENT DOCUMENTS

| | | | |
|---|---|---|---|
| 5,125,755 A | 6/1992 | Adler et al. | |
| 5,575,691 A | 11/1996 | Matthews | |
| 5,613,265 A | 3/1997 | Gemmell | |
| 5,647,766 A | 7/1997 | Nguyen | |
| 6,163,441 A | 12/2000 | Wood et al. | |
| 6,288,878 B1 | 9/2001 | Misso et al. | |
| 6,288,879 B1 | 9/2001 | Misso et al. | |
| 6,333,839 B1 * | 12/2001 | Misso et al. | 360/265.7 |
| 6,411,472 B1 | 6/2002 | Allsup | |
| 6,480,363 B1 | 11/2002 | Prater | |
| 6,525,910 B1 | 2/2003 | Macpherson et al. | |
| 6,527,449 B1 | 3/2003 | Koyama et al. | |
| 6,603,636 B2 | 8/2003 | Schwandt et al. | |
| 6,606,224 B2 | 8/2003 | Macpherson et al. | |
| 6,889,956 B2 | 5/2005 | Gutierrez et al. | |
| 7,085,108 B1 * | 8/2006 | Oveyssi et al. | 360/265.2 |
| 2002/0024770 A1 | 2/2002 | Hong et al. | |
| 2003/0053260 A1 * | 3/2003 | Barina et al. | 360/265.6 |
| 2003/0156357 A1 | 8/2003 | Brink et al. | |
| 2004/0145830 A1 | 7/2004 | Brink et al. | |
| 2004/0238944 A1 | 12/2004 | Bish et al. | |
| 2005/0225903 A1 | 10/2005 | Sprankle et al. | |
| 2006/0181811 A1 * | 8/2006 | Hanrahan et al. | 360/265.2 |
| 2006/0275076 A1 * | 12/2006 | Hanrahan et al. | 403/365 |
| 2008/0043374 A1 * | 2/2008 | Hanrahan et al. | 360/265.6 |
| 2008/0043375 A1 * | 2/2008 | Hanrahan et al. | 360/265.6 |
| 2008/0266717 A1 * | 10/2008 | Court et al. | 360/265.6 |

FOREIGN PATENT DOCUMENTS

| | | |
|---|---|---|
| DE | 1 855 948 | 8/1962 |
| DE | 29 50 985 | 12/1979 |
| EP | 1 067 336 | 1/2001 |
| FR | 2 627 620 | 12/1988 |
| GB | 1094610 | 6/1965 |
| GB | 1297599 | 4/1971 |
| GB | 1386738 | 2/1973 |
| GB | 2382386 | 5/2003 |
| GB | 2413594 | 11/2005 |
| GB | 2413608 | 11/2005 |
| JP | 2003-518592 | 6/2003 |
| JP | 2003-522912 | 7/2003 |
| JP | 2005-114025 | 4/2005 |
| WO | WO 01/41136 | 6/2001 |
| WO | WO 03/025907 | 3/2003 |
| WO | WO 2005/106268 | 11/2005 |
| WO | WO 2006/056731 | 6/2006 |

* cited by examiner

TOLERANCE RING FOR DATA STORAGE WITH OVERLAPPING TAB FEATURE FOR MASS CONTROL

FIELD OF THE INVENTION

This invention relates generally to tolerance rings used in connection with bearings. More particularly, the invention pertains to tolerance rings used between cartridge bearings and actuator arms in information storage devices.

DESCRIPTION OF THE RELATED ART

A key component of any computer system is a device to store data. One common place for storing massive amounts of data in a computer system is on a disc drive. The most basic parts of a disc drive are a disc that is rotated, an actuator that moves a transducer to various locations on the disc, and electrical circuitry that is used to write and read data to and from the disc. Coupled to the actuator is a head-gimbal assembly (HGA) that includes a head and metal suspension. The HGA's can be stacked together into a head-stack assembly (HSA), which is propelled across the disk surface by the actuator. There are a variety of disc drives in use today, such as hard disc drives, zip drives, floppy disc drives. All utilize either rotary or linear actuators.

In hard disk drives, magnetic heads read and write data on the surfaces of rotating disks that are co-axially mounted on a spindle motor. The magnetically-written "bits" of information are laid out in concentric circular "tracks" on the surfaces of the disks. The disks must rotate quickly so that the computer user does not have to wait long for a desired bit of information on the disk surface to become positioned under the head. In modern disk drives, data bits and tracks must be extremely narrow and closely spaced to achieve a high density of information per unit area of the disk surface.

The required small size and close spacing of information bits on the disk surface have consequences on the design of the disk drive device and its mechanical components. Among the most important consequences is that the magnetic transducer on the head must operate in extremely close proximity to the magnetic surface of the disk. Because there is relative motion between the disk surface and the magnetic head due to the disk rotation and head actuation, continuous contact between the head and disk can lead to tribological failure of the interface. Such tribological failure, known colloquially as a "head crash," can damage the disk and head, and usually cause data loss. Therefore, the magnetic head is designed to be hydrodynamically supported by an extremely thin air bearing so that its magnetic transducer can operate in close proximity to the disk while physical contact between the head and the disk is minimized or avoided. Typically, the head-to-disk spacing present during operation of modern hard disk drives is extremely small, measuring in the tens of nanometers.

Characteristics of the actuator used for moving the magnetic transducer in close proximity to the disk, must be considered by the designer to minimize vibration in response to rapid angular motions and other excitations. For example, the actuator arm must be stiff enough and the actuator pivot bearing must be of high enough quality so that the position of the head can be precisely controlled during operation. Also, the interface between the actuator arm and the pivot bearing must be of sufficient rigidity and strength to enable precise control of the head position during operation and to provide the boundary conditions necessary to facilitate higher natural resonant frequencies of vibration of the actuator arm. Typically, the actuator arm is fabricated from aluminum or an alloy of aluminum and is therefore softer and more easily scratched than the pivot bearing sleeve, which is typically fabricated from stainless steel.

The stiffness of the actuator must also be sufficient to limit deflection that might cause contact with the disk during mechanical shock events. Likewise, the interface between the actuator structure and the pivot bearing must be of sufficient strength to prevent catastrophic structural failure such as axial slippage between the actuator arm and the actuator pivot bearing sleeve during large mechanical shock events.

In many disc drives, the actuator arm or arms are fixed to the actuator pivot bearing by a tolerance ring. Typically, tolerance rings include an open cylindrical base portion and a plurality of contacting portions that are raised or recessed from the cylindrical base portion. The contacting portions are typically partially compressed during installation to create a radial preload between the mating cylindrical features of the parts joined by the tolerance ring. The radial preload compression provides frictional engagement that prevents actual slippage of the mating parts. For example, in disc drive applications, the radial compressive preload of the tolerance ring prevents separation and slippage at the interface between the actuator arm and the pivot bearing during operation and during mechanical shock events. The tolerance ring also acts as a radial spring. In this way, the tolerance ring positions the interior cylindrical part relative to the exterior cylindrical part while making up for radii clearance and manufacturing variations in the radius of the parts.

Additional features have been added to tolerance rings to obtain specific advantages. For example, in U.S. Pat. No. 6,288,878 to Misso et al., circumferential brace portions have been added to the tolerance ring to increase hoop strength. U.S. Pat. No. 6,338,839 to Misso et al. discloses a tolerance ring which provides a low consistent installation force profile.

U.S. Pat. No. 4,790,683 to Cramer, Jr. et al. discloses the use of a conventional tolerance ring in conjunction with a cylindrical shim in applications characterized by structurally significant radial vibration or loading. The shim prevents deformation of the soft underlying material and thereby prevents undesirable partial relief of the radial compression that maintains frictional engagement of the tolerance ring.

State of the art tolerance rings are typically manufactured from a flat metal sheet with stamping, forming, rolling, and other steps to provide ways to recess contacting portions and a final generally cylindrical shape. Because of the way tolerance rings are manufactured, they typically have a gap or spacing formed where the opposite edges of the rolled metal sheet meet.

The tolerance ring can be installed first into a cylindrical hole in an exterior part, such as an actuator arm, so that later a cylindrical inner part, such as an actuator pivot bearing, can be forcibly pushed into the interior of the tolerance ring to create a radial compressive preload that retains the parts by frictional engagement. In this case, the contacting portions may be recessed to a lesser radius than the base portion as well as raised to a greater radius than the base portion. Alternatively, a tolerance ring can be installed first around a cylindrical inner part, such an actuator pivot bearing. The inner part, together with the tolerance ring, is then forcibly pushed into the interior of the cylindrical hole in an exterior part, such as an actuator arm, to create a radial compressive preload that retains the parts by frictional engagement. In this case, the contacting portions of the tolerance ring are typically raised to a greater radius than the base portion.

The stiffness and mass characteristics of a tolerance ring can influence the HSA bandwidth. For example, the gap or spacing between the ends in prior art tolerance rings can cause mass imbalance thereby affecting the eccentricity and alignment of the actuator. Most disc drive makers live with this problem and tolerance ring manufacturers try to minimize the gap by allowing for as small a gap as possible while avoiding the possibility of the two ends of the tolerance ring from touching, after assembly.

To compensate for mass imbalance, disk drive makers are forced to either manually align the gap in a direction known by trial and error to reduce mass imbalance (also referred to as clocking) or add overall eccentric mass which reduces performance. Clocking does not remove the mass imbalance, but rather makes it known and thus possible to compensate for in other ways, for instance, by balancing nearby parts such as actuator arm or fan tail. Furthermore, minimizing the gap helps reduce mass imbalance but the tolerance ring ends are still rather long due to manufacturing constraints. Consequently, the space between the bumps juxtapose the gap is larger than the space between the bumps elsewhere.

With an increasing demand for improved consistency in installing the actuator arm in a hard disk, there remains a continuing need in the art for a tolerance ring that reduces mass imbalance and mass eccentricity.

SUMMARY OF THE INVENTION

A tolerance ring configured to maintain mass eccentricity or mass imbalance of an actuator arm has a substantially cylindrical base portion with a first radius about an axis and a length extending parallel to the axis of the cylindrical base portions, the cylindrical base portion having a first tab positioned proximate to a second tab along the length of the cylindrical base portions.

In one embodiment, the tolerance ring reduces mass eccentricity by radially displacing the first tab to a second radius about the axis such that a radial gap is formed between the first tab and second tab. In another embodiment, the tolerance ring maintains mass eccentricity by overlapping the first tab with the second tab.

BRIEF DESCRIPTION OF THE DRAWINGS

Many of the advantages, object and features of the invention will become readily appreciated by reference to the following detailed description when considered in conjunction with the accompanying drawings in which like reference numerals describe like parts throughout the figures, and wherein.

DETAILED DESCRIPTION

Methods that implement the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
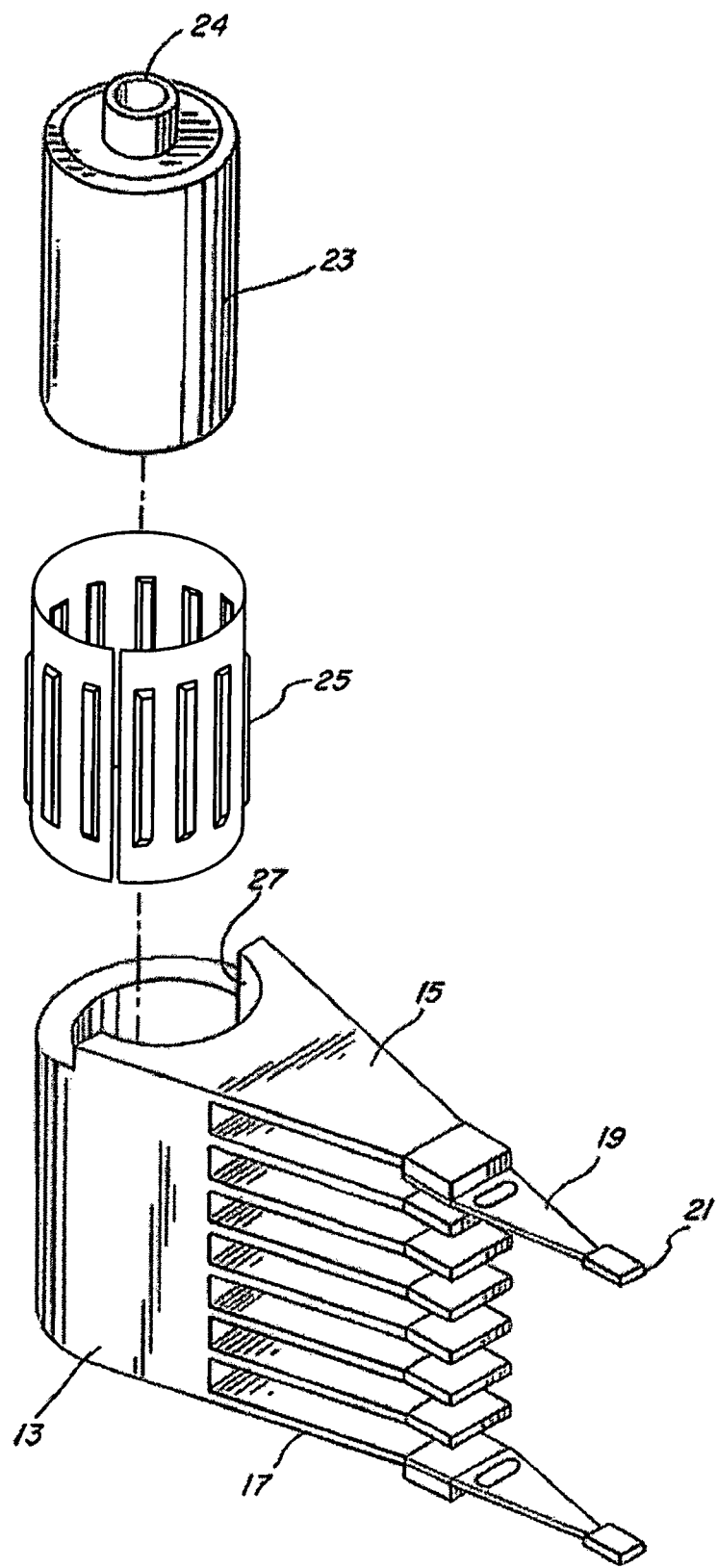
FIG. 1 is an exploded view of a prior art disc drive actuator arm assembly and tolerance ring design.

FIG. 1 is an exploded view of an actuator arm assembly 13 which includes a pivot bearing cartridge 23. The pivot bearing cartridge 23 is cylindrical in shape and includes a shaft 24 about which the actuator arm assembly 13 rotates. The actuator arm assembly 13 has an opening or bore 27 therein. The pivot bearing cartridge 23 fits within the bore 27 of actuator arm assembly 13. The tolerance ring 25 fits within the space between the bore 27 and the outside diameter of the pivot bearing cartridge 23.

Actuator arm assembly 13 has a plurality of arms 15 in the head-stack assembly 17. Each arm 15 typically carries at least one suspension 19. Attached to the suspension 19 are recording heads (sliders) 21 which include magnetic transducers that magnetize the surface of the disc (not shown) to represent and store the desired data.

As is well known in the art of disc drives, each of the discs has a series of concentric tracks onto which the magnetic information is recorded. The sliders 21 and the magnetic transducers incorporated therein are moved over the surface of a particular disc so that a magnetic representation of data can be stored on any of the tracks on the disc. The particular actuator arm assembly 13 shown in FIG. 1 causes transducer movement to be rotational and about the shaft 24 of pivot bearing cartridge 23. Rotating the actuator arm assembly 13 causes the slider 21 and the transducer in the slider to be repositioned over the surface of the disc below it.

The tolerance ring 25 can be installed first into the bore 27 of actuator arm assembly 13 so that later a generally cylindrical inner part, such as the pivot bearing cartridge 23, can be forcibly pushed into the interior of the tolerance ring 25 to create a radial compressive preload that retains the parts by frictional engagement. Alternatively, the tolerance ring 25 can be installed first around the pivot bearing cartridge 23. The pivot bearing cartridge 23, together with the tolerance ring 25, is then forcibly pushed into the bore 27 of actuator arm assembly 13 to create a radial compressive preload that retains the parts by frictional engagement.

Figure 2:
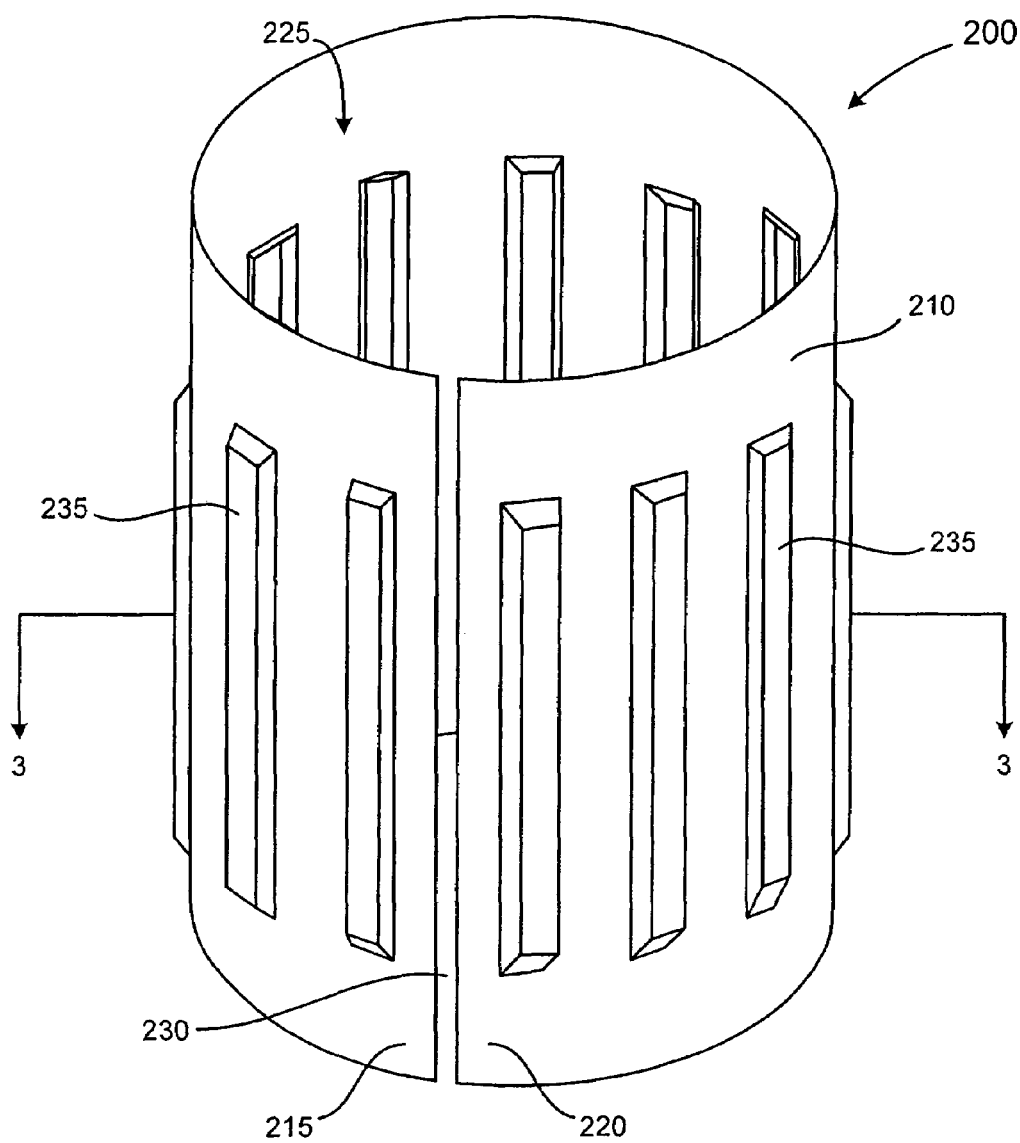
FIG. 2 is a perspective view of a prior art tolerance ring design.

FIG. 2 illustrates a perspective view of a prior art tolerance ring design 200. The tolerance ring 200 is formed from a substantially planar base portion 210 that is curved to fit around the pivot bearing cartridge 23 (FIG. 1). One end of the planar base portion 210 has a first tab or edge 215 along the length of the ring. The other end of the planar base part 210 has a second tab or edge 220. The base portion 210 has a first radius about a central axis and extends for a length parallel to the central axis. Radial expansion and contraction of cylindrical opening 225 is facilitated by an axially-oriented linear gap 230 along the length of tolerance ring 200 created by the opposite spaced tabs or edges 215 and 220.

In one embodiment, the tolerance ring 200 is made from 300 Series stainless steel.

The tolerance ring 200 has a plurality of contacting portions 235. The contacting portions 235 generally have a rhomboidal cross-sectional shape extending axially along the base portion 210. As shown in FIG. 2, the contacting portions 235 project radially outward in a direction away from the interior of the tolerance ring 200. It is recognized that alternative configurations known in the art include tolerance rings with contacting portions 235 that project radially inward or project inward and outward in an alternating fashion.

Figure 3:
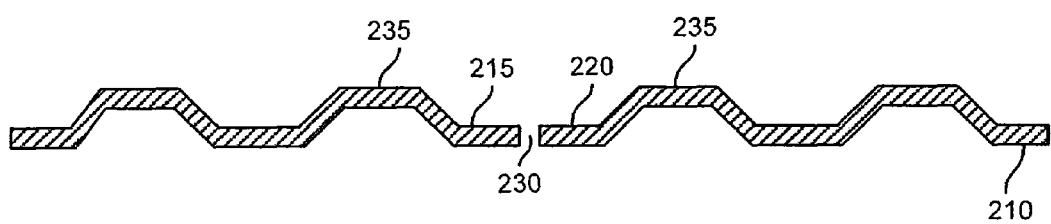
FIG. 3 is a cross-sectional view of the tolerance ring of FIG. 2 along line 3-3 of FIG. 2, illustrating the circumferential gap formed between the edges of the tolerance ring.

Referring to FIG. 3, a cross-sectional view of the prior art tolerance ring of FIG. 2 along line 3-3 of FIG. 2 is illustrated. FIG. 3 shows the linear gap 230 formed by the first tab 215 and the second tab 220. This gap 230 can cause mass imbalance thereby affecting the eccentricity and alignment of the actuator arm assembly 13. This is because the spacing between the contacting portions 235 on opposite sides of the circumferential gap 230 is larger than the space between contacting portions 235 elsewhere.

Figure 4:
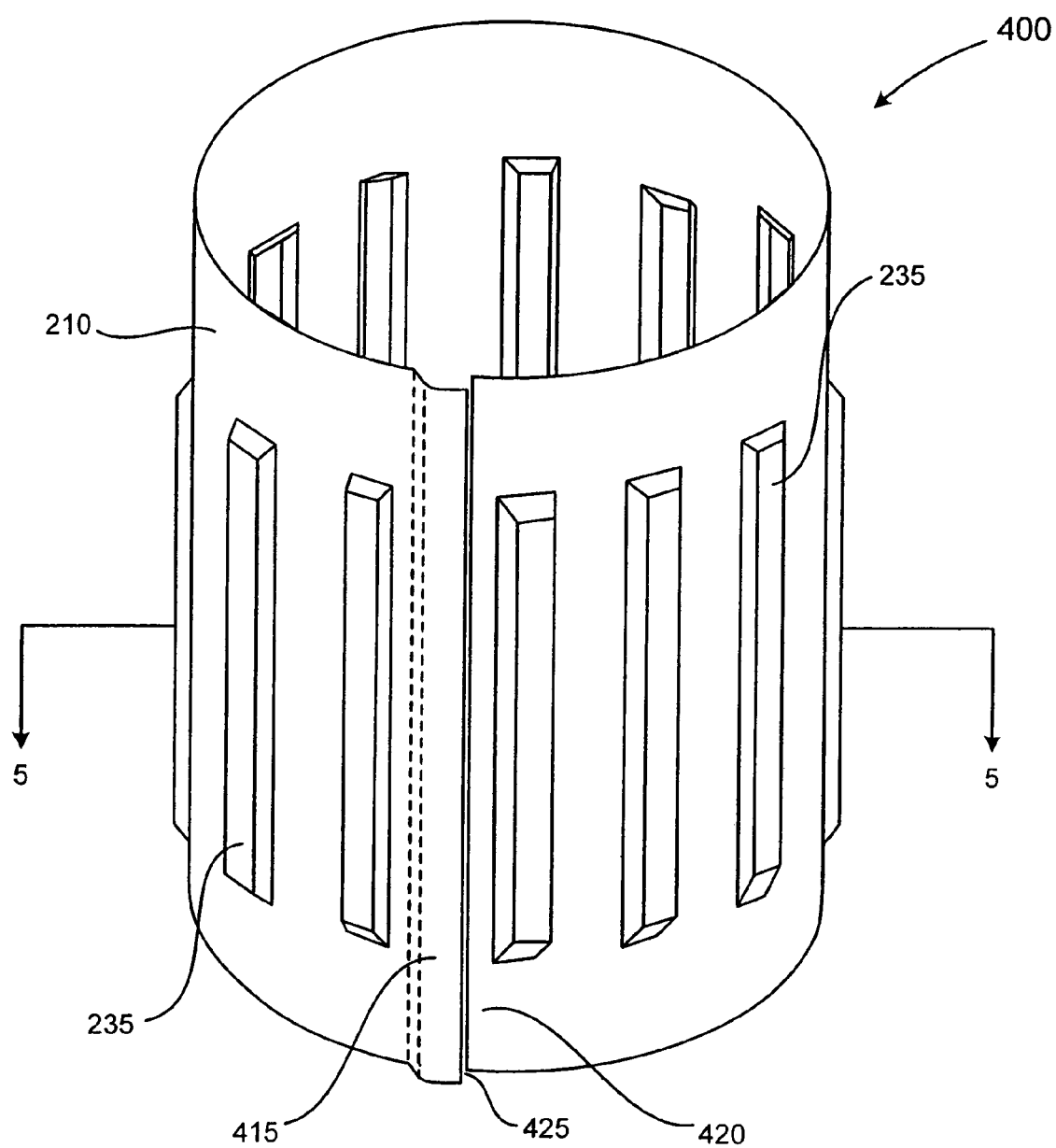
FIG. 4 is a perspective view of a tolerance ring that accounts for mass imbalance and mass eccentricity according to one embodiment of the present invention.

The present invention accounts for mass imbalance and mass eccentricity. FIG. 4 illustrates a perspective view of a tolerance ring 400 according to one embodiment of the present invention. The tolerance ring 400 has a first tab 415 and a second tab 420 along the length of the base portion 210. The base portion 210 has a first radius about its central axis that extends for a length parallel to the central axis. The first tab 415 is positioned proximate to and radially displaced at a second radius about the axis such that a radial gap 425 is formed between the first tab 415 and the second tab 420. The second radius of the first tab 415 is shown greater than the first radius of the base portion 210. It is to be understood that the first tab 415 can be radially displaced by a distance that is greater than or less than the radius of the second tab 420.

Figure 5:
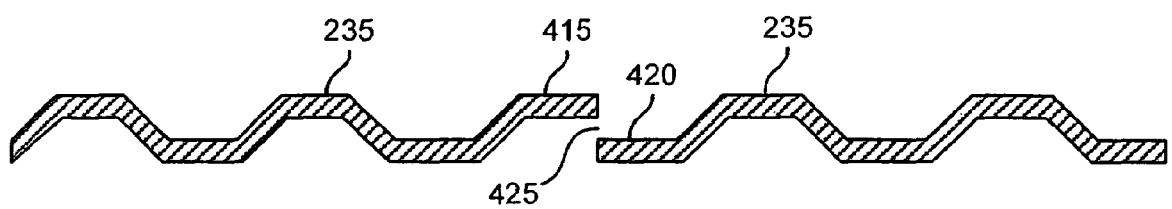
FIG. 5 is a cross-sectional view of the tolerance ring of FIG. 4 along line 5-5 of FIG. 4, illustrating an overlapping tab feature in accordance to an embodiment of the present invention.
Figure 6:
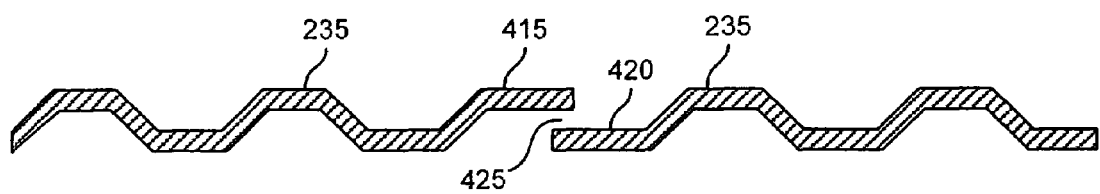
FIG. 6 is a cross-sectional view of the tolerance ring of FIG. 4 along line 5-5 of FIG. 4, illustrating an overlapping tab feature in accordance to an embodiment of the present invention.
Figure 7:
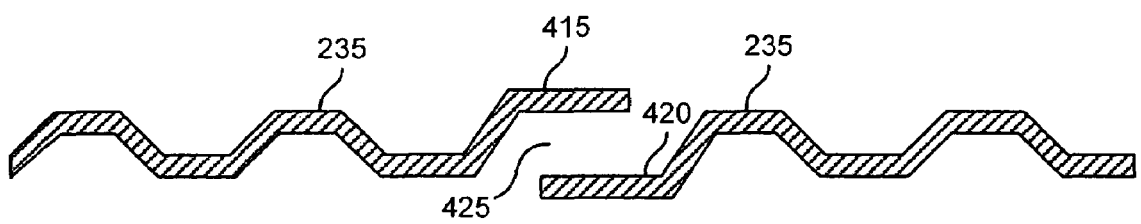
FIG. 7 is a cross-sectional view of the tolerance ring of FIG. 4 along line 5-5 of FIG. 4, illustrating an overlapping tab feature in accordance to an embodiment of the present invention.

FIGS. 5, 6 and 7 illustrate cross-sectional views of the tolerance ring 400 of FIG. 4 along line 5-5 of FIG. 4. FIG. 5 shows a radial gap 425 formed between non-overlapping tabs 415 and 420, while FIG. 6 shows a radial gap 425; formed between overlapping tabs 415 and 420. In one embodiment, the first tab 415 is preferably displaced by a radial distance substantially equal to the outward radial projection of the contacting portions 235. Both FIGS. 5 and 6 show the second tab 420 in congruence with the base portion 210, such that the second tab 420 is radially displaced by the first radius of the base portion 210.

Alternatively, the second tab 420 can be displaced at a second radius about the central axis while maintaining the radial gap 425 with the first tab 415. A combination of radially displacing both tabs 415 and 420 is illustrated in FIG. 7. The first tab 415 can be displaced at a second radius about the axis, while the second tab 420 is displaced at a different third radius. In all instances, a radial gap 425 exists between the tabs 415 and 420.

By eliminating the circumferential gap 230 between tabs 415 and 420 in the tolerance ring 400, the mass imbalance of the actuator arm assembly 13 is reduced and the mass eccentricity is improved.

Figure 8:
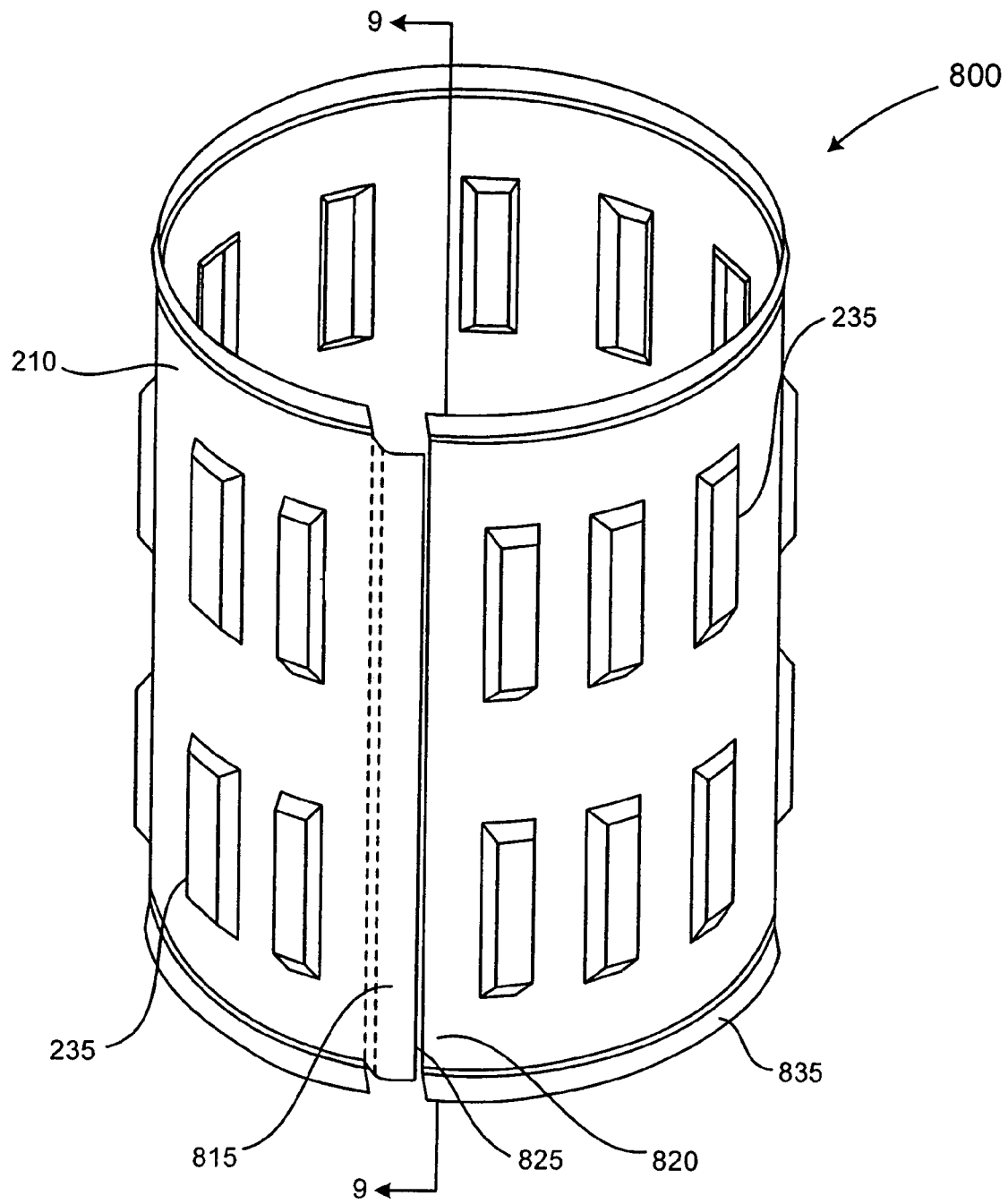
FIG. 8 is a perspective view of another tolerance ring that accounts for mass imbalance and mass eccentricity according to one embodiment of the present invention.

FIG. 8 illustrates a perspective view of a tolerance ring 800 according to one embodiment of the present invention. The tolerance ring 800 has a first tab 815 and a second tab 820 that extend substantially along the length of the base portion 210. The base portion 210 has a first radius about its central axis that extends for a length parallel to the central axis. The first tab 815 is positioned proximate to and radially displaced at a second radius about the axis such that a radial gap 825 is formed between the first tab 815 and the second tab 820. The second radius of the first tab 815 is shown greater than the first radius of the base portion 210. It is to be understood that the first tab 815 can be radially displaced by a distance that is greater than or less than the radius of the second tab 820.

As shown in FIG. 8, the tolerance ring 800 has an upper rim 830 and a lower rim 835 around the edge of the tolerance ring 800. The rim 830 or 835 allows for easy installation of the tolerance ring 800 around the pivot bearing cartridge 23. The pivot bearing cartridge 23, together with the tolerance ring 800, is then forcibly pushed into the bore 27 of actuator arm assembly 13 to create a radial compressive preload that retains the parts by frictional engagement.

Figure 9:
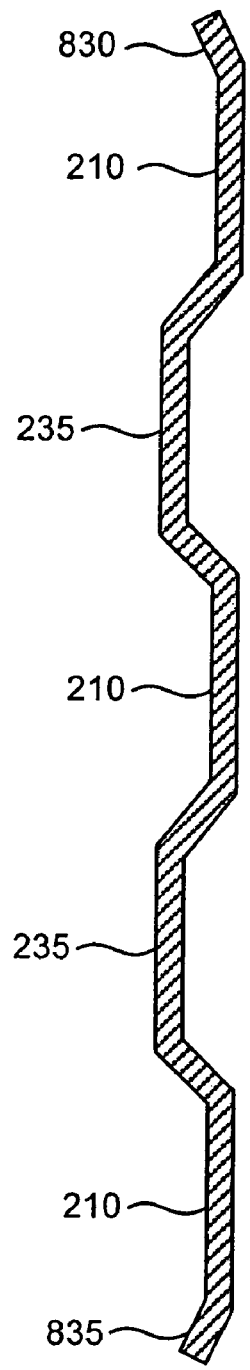
FIG. 9 is a cross-sectional view of the tolerance ring of FIG. 8 along line 9-9 of FIG. 8, illustrating a rim around the edge of the tolerance ring in accordance to an embodiment of the present invention.

FIG. 8 also illustrates an alternate configuration for contacting portions 235. The contacting portions 235 are arranged in a plurality of rows along the surface of the planar base portion 13. FIG. 9 is a cross-sectional view of the tolerance ring of FIG. 8 along line 9-9 of FIG. 8. FIG. 9 shows the rims 830 and 835 flaring to the outside of the tolerance ring 800. This allows the pivot bearing cartridge 23 to be easily inserted into cylindrical opening 225 of the tolerance ring 800. FIG. 9 also shows a cross-sectional view of the two rows of contacting portions 235.

By eliminating the circumferential gap 230 between tabs 815 and 820 in the tolerance ring 800, and utilizing a rim 830 or 835, the mass imbalance of the actuator arm assembly 13 is reduced, the mass eccentricity is improved, and the tolerance ring 800 installation is simplified.

What is claimed is:

1. A tolerance ring used in coupling an actuator to a pivot bearing, comprising:
    a substantially cylindrical base portion having a first radius about a central axis and extending for a length parallel to the central axis, the cylindrical base portion having a first tab and a second tab extending substantially along the length of the cylindrical base portion, the first tab is positioned proximate to and radially displaced relative to the second tab such that a radial gap is formed between the first tab and the second tab; and
    a plurality of contacting portions, each contacting portion projecting radially at a second radius about the axis.

2. The tolerance ring of claim 1, wherein the second radius of the contacting portion is less than the first radius of the base portion.

3. The tolerance ring of claim 1, wherein the second radius of the contacting portion is greater than the first radius of the base portion.

4. The tolerance ring of claim 1, wherein the first tab overlaps the second tab.

5. The tolerance ring of claim 1, further comprises:
    radially displacing the first tab at a second radius about the axis;
    radially displacing the second tab at a third radius about the axis, such that a radial gap is formed between the first tab and the second tab; and wherein the second radius is greater than the first radius and the third radius is less than the first radius.

6. A tolerance ring, comprising:
a substantially cylindrical base portion having a first radius about an axis and extending an axial length along the axis;
the cylindrical base portion having a first tab and a second tab along the axial length; and
wherein the first tab is positioned proximate to and radially displaced relative to the second tab such that a radial gap is formed between the first tab and the second tab.

7. The tolerance ring of claim 6, further comprising:
a plurality of contacting portions, each contacting portion project a radial distance from the base portion.

8. The tolerance ring of claim 6, wherein the first tab overlaps the second tab.

9. An actuator arm assembly for an information storage device, comprising:
an actuator arm;
an actuator pivot bearing;
a tolerance ring retaining the actuator pivot bearing relative to the actuator arm and maintaining mass eccentricity of the actuator arm, wherein the tolerance ring comprises:
a substantially cylindrical base portion having a first radius about a central axis and extending for a length parallel to the central axis, the cylindrical base portion having a first tab and a second tab extending along the length of the cylindrical base portion, the first tab is positioned proximate to and radially displaced relative to the second tab such that a radial gap is formed between the first tab and the second tab; and
a plurality of contacting portions, each contacting portion project radially at a second radius about the axis.

10. The actuator arm assembly of claim 9, wherein the second radius of the contacting portion is less than the first radius of the base portion.

11. The actuator arm assembly of claim 9, wherein the second radius of the contacting portion is greater than the first radius of the base portion.

12. The actuator arm assembly of claim 9, wherein the first tab overlaps the second tab.

13. The actuator arm assembly of claim 9, wherein the tolerance ring comprises a 300 Series stainless steel.

14. The actuator arm assembly of claim 9, wherein the first tab is radially displaced at a third radius about the axis that is greater than the first radius of the base portion.

15. The actuator arm assembly of claim 14, wherein the second tab is radially displaced at a fourth radius about the axis that is less than the first radius of the base portion.

16. The actuator arm assembly of claim 9, wherein the second tab is radially displaced at a fourth radius about the axis that is less than the first radius of the base portion.

* * * * *